US012744232B2

(12) United States Patent
Park et al.

(10) Patent No.: US 12,744,232 B2
(45) Date of Patent: Sep. 22, 2026

(54) APPARATUS FOR INSERTING ELECTRODE ASSEMBLY AND METHOD FOR INSERTING ELECTRODE ASSEMBLY USING SAME

(71) Applicant: SK On Co., Ltd., Seoul (KR)

(72) Inventors: Sang Jun Park, Daejeon (KR); Chil Joong Kim, Daejeon (KR); Ji Eun Ahn, Daejeon (KR)

(73) Assignee: SK ON CO., LTD., Seoul (KR)

(*) Notice: Subject to any disclaimer, the term of this patent is extended or adjusted under 35 U.S.C. 154(b) by 829 days.

(21) Appl. No.: 18/189,605

(22) Filed: Mar. 24, 2023

(65) Prior Publication Data

US 2023/0352720 A1 Nov. 2, 2023

(30) Foreign Application Priority Data

Mar. 24, 2022 (KR) ........................ 10-2022-0036866

(51) Int. Cl.
*H01M 10/00* (2006.01)
*B25J 15/00* (2006.01)
*H01M 10/04* (2006.01)

(52) U.S. Cl.
CPC ..... *H01M 10/0404* (2013.01); *B25J 15/0014* (2013.01); *B25J 15/0028* (2013.01)

(58) Field of Classification Search
None
See application file for complete search history.

(56) References Cited

U.S. PATENT DOCUMENTS

2016/0311107 A1* 10/2016 Yoshimura ............... B25J 9/047
2018/0117772 A1* 5/2018 Ikebe .................... G01L 1/2287
2018/0184764 A1* 7/2018 Jurkovic ............. B25J 15/0273

FOREIGN PATENT DOCUMENTS

JP 2020145159 A 9/2020
JP 2021122928 A 8/2021
KR 10-2017-0085275 A 7/2017
KR 10-2019-0105855 A 9/2019
KR 10-2204771 B1 1/2021
KR 20210037902 A 4/2021
KR 20210096023 A 8/2021
KR 102354867 B1 1/2022
WO WO-2022045299 A1 * 3/2022 .......... B25J 15/0028

(Continued)

OTHER PUBLICATIONS

Office Action for the Korean Patent Application No. 10-2022-0036866 issued by the Korean Intellectual Property Office on Oct. 4, 2023.

(Continued)

*Primary Examiner* — Steven M Marsh
(74) *Attorney, Agent, or Firm* — IP&T GROUP LLP

(57) ABSTRACT

Proposed is an apparatus for inserting an electrode assembly, the apparatus including a clamping unit configured to clamp or unclamp the electrode assembly, and an articulated robot including one or more links rotatably connected to each other by joint shafts and configured to mount the clamping unit on a front link. Here, the electrode assembly is inclinedly introduced and accommodated in a pouch through an open space between an upper pouch and a lower pouch. In addition, proposed is a method of inserting an electrode assembly using the above-described apparatus.

11 Claims, 7 Drawing Sheets

(56) References Cited

FOREIGN PATENT DOCUMENTS

WO WO-2022050202 A1 * 3/2022 .......... H10P 72/7602
WO WO-2022137926 A1 * 6/2022 .............. H10P 72/78

OTHER PUBLICATIONS

Extended European Search Report on the European Patent Application No. 23163848.7 issued by the European Patent Office on Aug. 10, 2023.

Notice of Allowance for the Korean Patent Application No. 10-2022-0036866 issued by the Korean Intellectual Property Office on Feb. 5, 2024.

* cited by examiner

APPARATUS FOR INSERTING ELECTRODE ASSEMBLY AND METHOD FOR INSERTING ELECTRODE ASSEMBLY USING SAME

CROSS REFERENCE TO RELATED APPLICATION

The present application claims priority to Korean Patent Application No. 10-2022-0036866, filed Mar. 24, 2022, the entire contents of which is incorporated herein for all purposes by this reference.

BACKGROUND OF THE INVENTION

Field of the Invention

The present disclosure relates generally to an apparatus for inserting an electrode assembly and, more particularly, to an apparatus for inclinedly inserting an electrode assembly into a pouch. In addition, the present disclosure also relates to a method of inserting an electrode assembly.

Description of the Related Art

In general, secondary batteries are batteries which can be repeatedly charged and discharged. The secondary batteries are widely used as power sources for electric vehicles (EVs), hybrid vehicles (HEVs), and energy storage systems (ESSs).

Depending on the shape of an outer casing in which an electrode assembly is accommodated, the secondary batteries may be classified into a cylinder type, a prismatic type, and a pouch type. Recently, the demand for thin pouch-type secondary batteries has been increased.

A pouch-type secondary battery generally includes an electrode assembly in which a positive electrode plate, a negative electrode plate, and a separator are sequentially stacked, a pouch for accommodating the electrode assembly and an electrolyte solution, and electrode tabs extending from the electrode assembly and exposed to the outside. As illustrated in FIG. 1, in the manufacturing process of a conventional pouch-type secondary battery, an electrode assembly 100 is inserted into a pouch 200 in such a manner that an upper pouch 210 and a lower pouch 220 are opened at 180°, then the electrode assembly 100 is aligned above a second storage part 221, and finally the electrode assembly 100 is dropped to be accommodated the second storage part 221. When the electrode assembly 100 is placed in the second storage part 221, a hinge part 230 between the upper pouch 210 and the lower pouch 220 is bent so that the upper pouch 210 and the lower pouch 220 overlap each other. After that, the pouch 200 is packaged by sealing the outer edge of the upper pouch 210 and the outer edge of the lower pouch 220 that face each other by a bonding method such as thermal fusion.

As is well known to those skilled in the art, and as disclosed in Patent Document 1, the electrode assembly is aligned above the second storage part of the pouch in a state of being supported by a pair of horizontally disposed fork members, and then is dropped toward the second storage part by widening a gap between the pair of fork members. Such a conventional insertion method of the electrode assembly requires a separate complicated configuration or device for preventing placement failure of the electrode assembly that may occur during the process of vertically dropping the electrode assembly. Also, the hinge part of the pouch may undergo stress concentration caused by repetitive bending (or warping) deformation may cause cracks in the pouch.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Korean Patent No. 10-2204771

SUMMARY OF THE INVENTION

Accordingly, the present disclosure has been made keeping in mind the above problems occurring in the related art, and an objective of the present disclosure is to provide an apparatus for inserting an electrode assembly, the apparatus being capable of accommodating the electrode assembly in a pouch by inclinedly inserting the electrode assembly at a predetermined angle through an open space between an upper pouch and a lower pouch of the pouch.

Another objective of the present disclosure is to provide a method of inserting an electrode assembly using the above described apparatus.

In order to achieve the above objectives, according to one aspect of the present disclosure, there is provided an apparatus for inserting an electrode assembly, the apparatus including: a clamping unit configured to clamp or unclamp the electrode assembly; and an articulated robot including one or more links rotatably connected to each other by joint shafts and configured to mount the clamping unit on a front link. Here, the electrode assembly may be inclinedly introduced and accommodated in a pouch through an open space between an upper pouch and a lower pouch.

Preferably, the clamping unit may include: a base coupled to the front link of the articulated robot; a fixed fork fixed in position to the base; and a moving fork disposed to be movable in a longitudinal direction of the base with respect to the fixed fork.

In addition, the clamping unit may further include a pusher configured to reciprocate on the fixed fork to push the electrode assembly into the pouch.

In an embodiment of the present disclosure, the pusher may include an actuator, an operating rod configured to reciprocate by operation of the actuator, and a pressing extension part disposed at a front end of the operating rod.

The pouch may include the upper pouch, the lower pouch, and a hinge part foldably connecting the upper pouch and the lower pouch to each other, and the electrode assembly may be into the pouch through the open space, the open space being disposed to face the hinge part and formed between the upper pouch and the lower pouch.

Optionally, an opening angle of the open space may be set to equal to or less than 90°.

According to another aspect of the present disclosure, there is provided a method of inserting an electrode assembly, the method including: preparing a pouch that includes an upper pouch, a lower pouch, and a hinge part foldably connecting the upper pouch and the lower pouch to each other; opening the pouch to form an open space between the upper pouch and the lower pouch facing the hinge part; introducing a clamping unit on which the electrode assembly is clamped through the open space; withdrawing the clamping unit from which the electrode assembly is unclamped.

Here, the electrode assembly may be inclinedly introduced and accommodated in the pouch through the open space.

The withdrawing of the clamping unit may include: unclamping the electrode assembly; pushing the electrode assembly into the pouch; and withdrawing the clamping unit while adjusting an inclination angle of the clamping unit in an increasing manner as the clamping unit is moved backward.

Preferably, the clamping unit may include: a base configured to be angularly or rotatably movable; a fixed fork fixed in position to the base; and a moving fork disposed to be movable in a longitudinal direction of the base with respect to the fixed fork.

In addition, the clamping unit may further include a pusher configured to reciprocate on the fixed fork to push the electrode assembly into the pouch.

Optionally, an opening angle of the open space may be set to equal to or less than 90°.

Features and advantages of the present disclosure will become more apparent from the following detailed description taken in conjunction with the accompanying drawings.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As apparent from the description given above, the present disclosure inclinedly introduces the electrode assembly at a predetermined angle through the open space of a partially opened pouch in a folded state, unlike a conventional method of dropping and accommodating an electrode assembly in a pouch in an unfolded state.

This can reduce a bendable range of the hinge part connecting the upper pouch and the lower pouch, thereby reducing load acting on the hinge part and thus reducing fatigue caused by bending and unbending of the hinge part. Thus, the present disclosure can solve problems such as breakage and cracks of the hinge part.

In addition, the present disclosure can flexibly insert the electrode assembly without limiting the open space of the pouch by increasing the degree of freedom of the clamping unit by means of the articulated robot.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
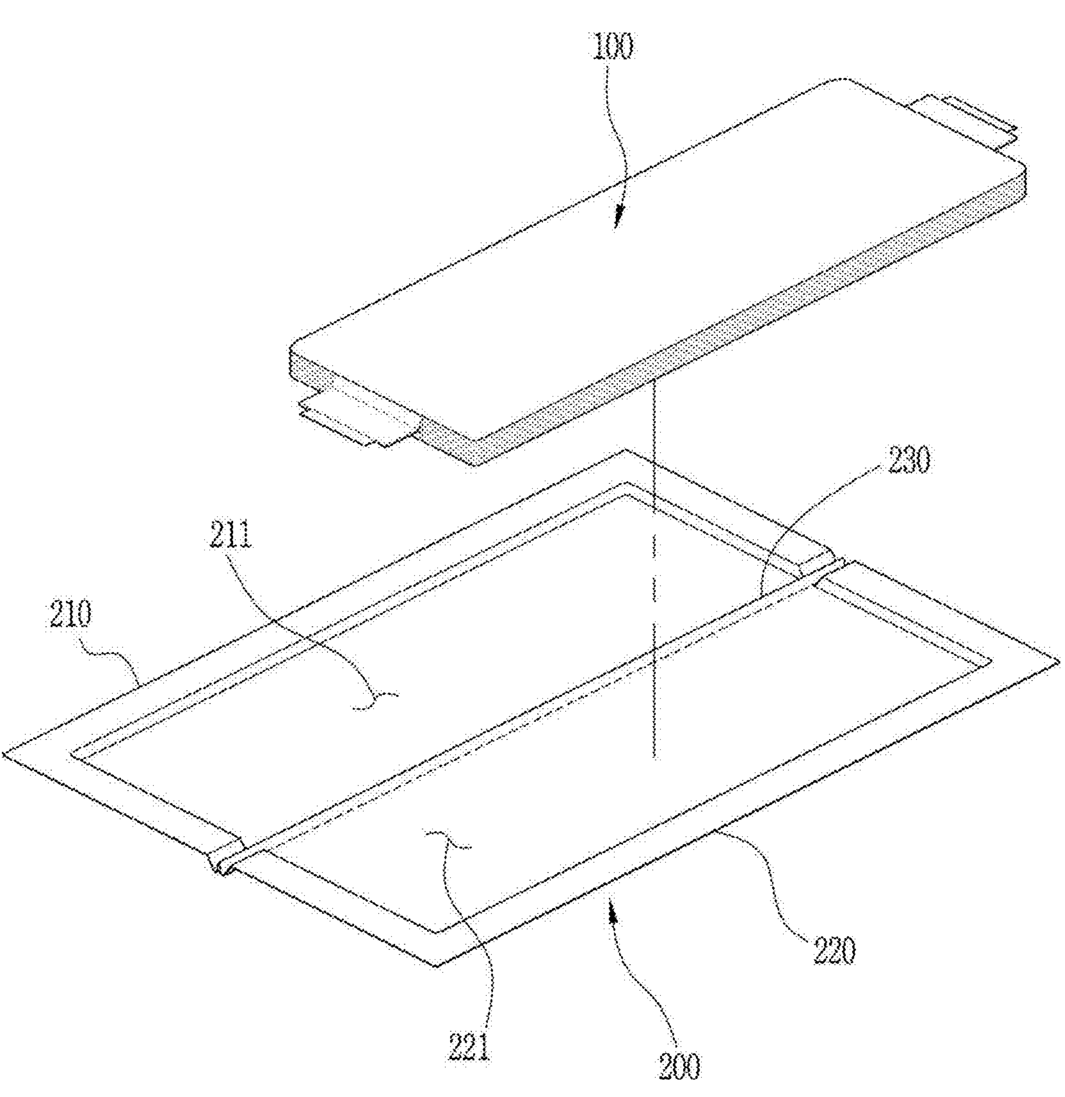
FIG. 1 is a view schematically illustrating an insertion method of an electrode assembly according to the related art.

The above and other objectives, specific advantages, and novel features of the present disclosure will be more clearly understood from the following detailed description and preferable embodiments when taken in conjunction with the accompanying drawings. As for reference numerals associated with parts in the drawings, the same reference numerals will refer to the same or like parts throughout the drawings. In the following description, details of well-known features and techniques may be omitted to avoid unnecessarily obscuring the present disclosure. Further, it will be understood that, although the terms "first", "second", etc. may be used only to distinguish one element from another element, these elements should not be limited by these terms. In the drawings, the thickness or size of some components is exaggerated, omitted, or schematically illustrated for convenience of description and clarity. Also, the size of each constituent element does not entirely reflect the actual size thereof.

Reference will now be made in detail to embodiments, examples of which are illustrated in the accompanying drawings.

The present disclosure relates to an apparatus for inserting an electrode assembly into a pouch. Preferably, the present disclosure is configured to position the electrode assembly in place in the pouch by inclinedly inserting the electrode assembly through an open space between an upper pouch and a lower pouch. More preferably, the present disclosure accommodates the electrode assembly in the pouch by inclinedly inserting the electrode assembly through the open space between the upper pouch and the lower pouch in a folded state of the pouch.

Here, as illustrated in FIG. 1, a pouch 200 includes an upper pouch 210 covering an upper side of an electrode assembly 100 and a lower pouch 220 covering a lower side of the electrode assembly 100. The upper pouch 210 and the lower pouch 220 are integrally disposed at symmetrical positions with respect to a hinge part 230. The present disclosure is not limited to the pouch 200 illustrated in FIG. 1, and can be applied to various types of pouches in which an upper pouch and a lower pouch are integrally formed to be foldable and an electrode assembly is accommodated.

Furthermore, in the present disclosure, the electrode assembly 100 may be a jelly-roll type electrode assembly formed by spirally winding a first electrode plate and a second electrode plate with a separator interposed therebetween. However, the type of the electrode assembly 100 is not limited to a specific type as long as it can be formed by repeatedly stacking the first electrode plate, the separator, and the second electrode plate and can provide a predetermined thickness in a stacking direction. As is known to those skilled in the art, when the first electrode plate is a positive electrode plate, the second electrode plate may be a negative electrode plate.

Figure 2:
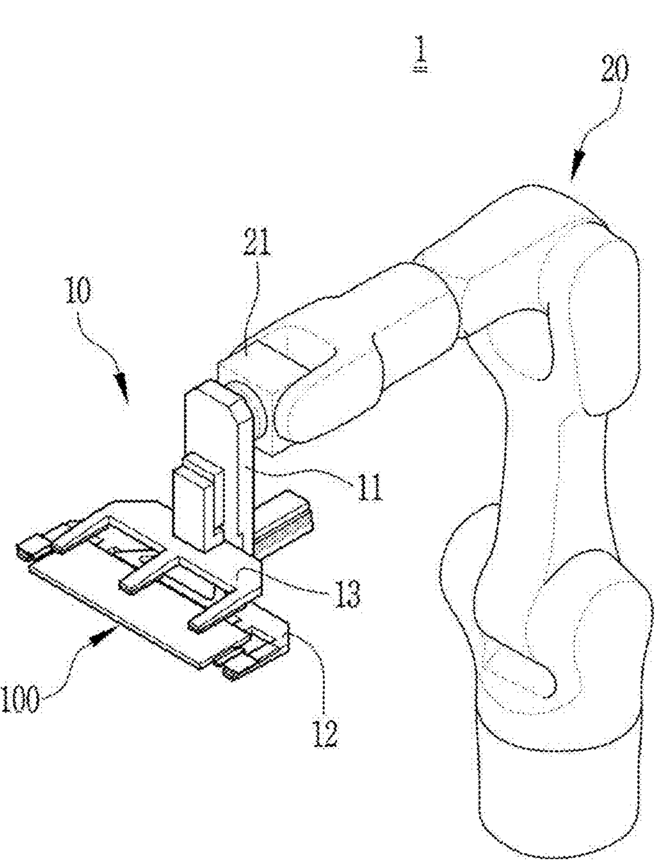
FIG. 2 is a perspective view schematically illustrating an apparatus for inserting an electrode assembly according to the present disclosure.
Figure 3:
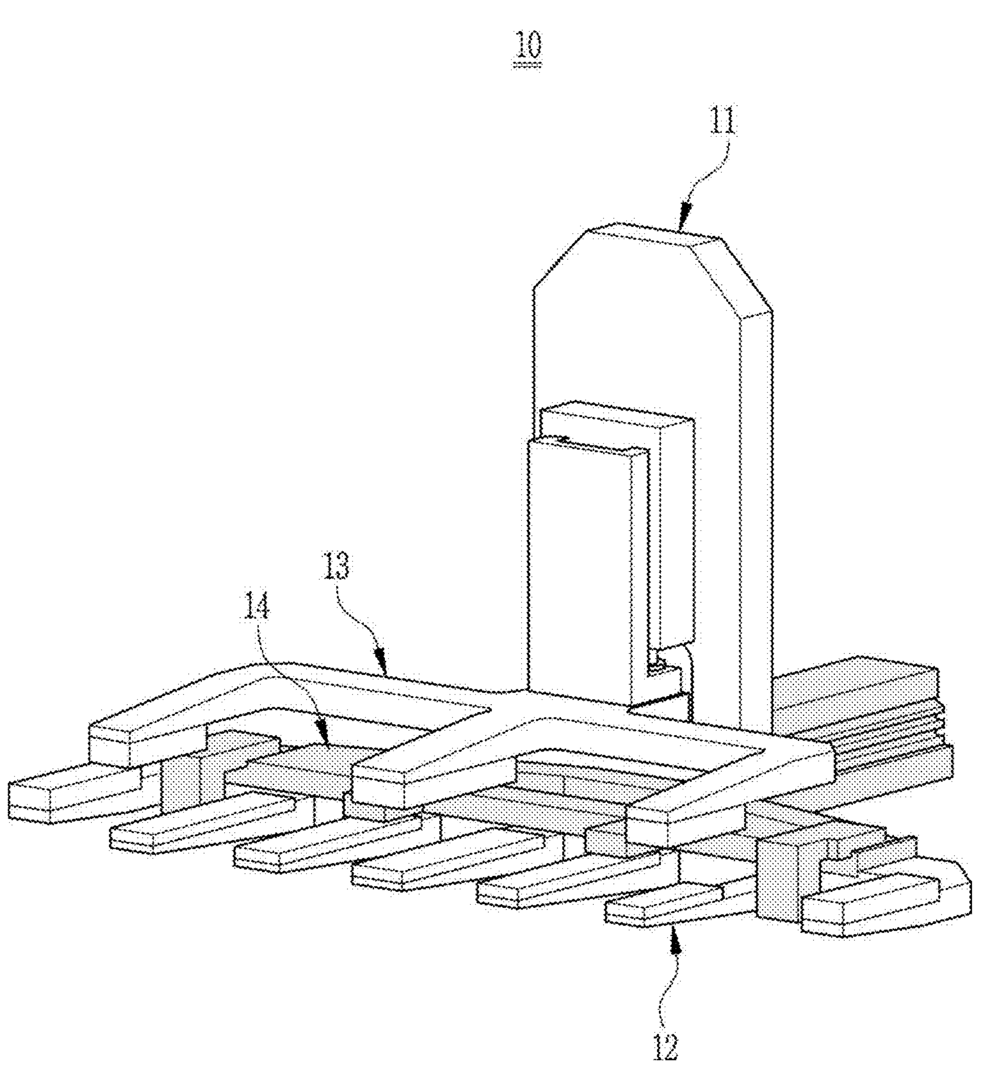
FIG. 3 is a perspective view schematically illustrating a clamping unit, which is a main part of the apparatus for inserting an electrode assembly according to the present disclosure.
Figure 4A:
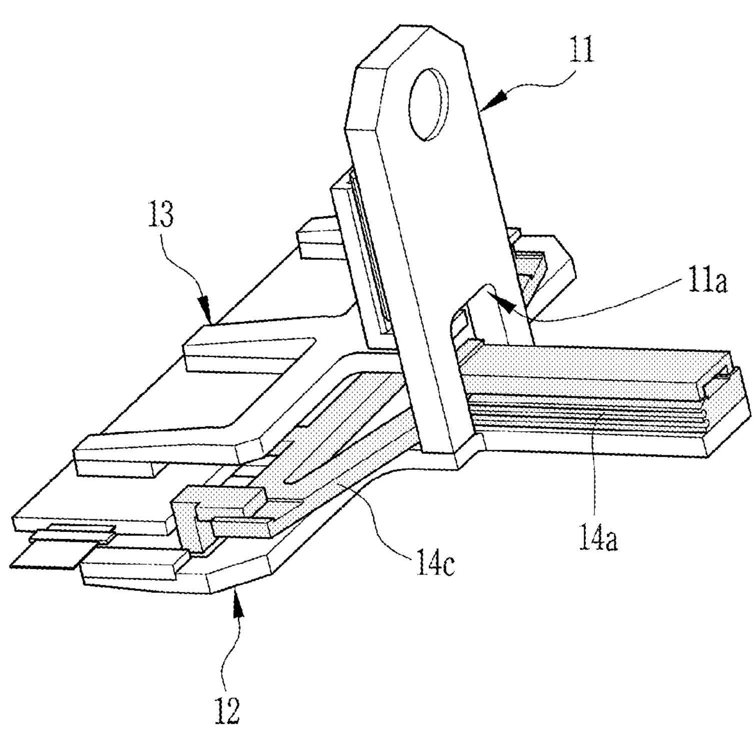
FIG. 4A is a view illustrating an operating state of a pusher in the clamping unit illustrated in FIG. 3, wherein a backward movement mode of the pusher is illustrated.
Figure 4B:
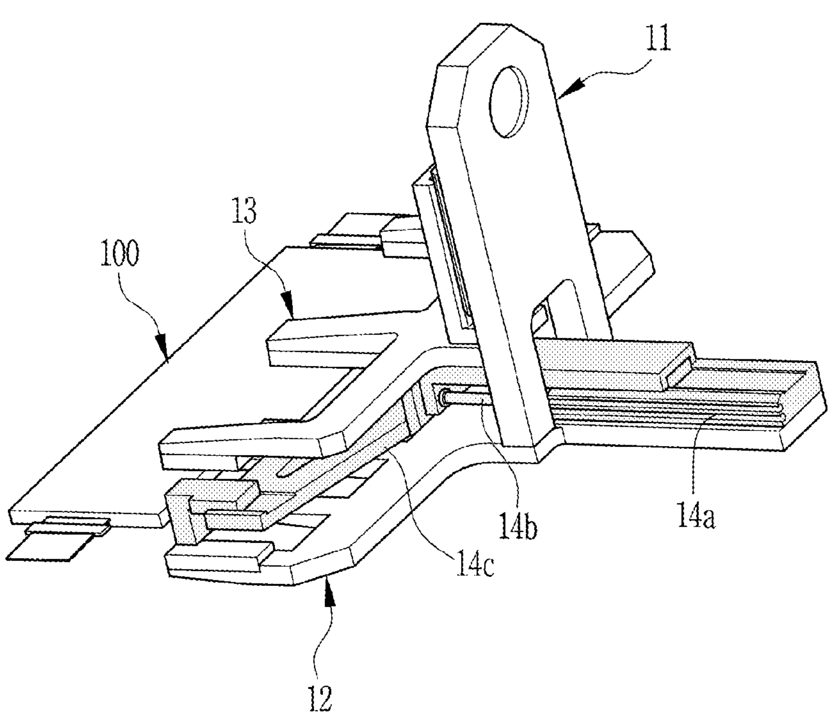
FIG. 4B is a view illustrating an operating state of a pusher in the clamping unit illustrated in FIG. 3, wherein a forward movement mode of the pusher is illustrated.

Referring to FIGS. 2 to 4, an apparatus 1 for inserting an electrode assembly 100 according to an exemplary embodiment of the present disclosure includes a clamping unit 10 for clamping or unclamping the electrode assembly 100, and an articulated robot 20 for mounting the clamping unit on a front link 21.

According to the present disclosure, the electrode assembly 100 is moved according to a spatial motion of the articulated robot 20 driven by one or more links rotatably connected to each other by joint shafts. Among the one or more links, the clamping unit 10 is mounted on the front link 21 located at a front end of the articulated robot 20. The present disclosure is not limited to the articulated robot 20 illustrated in FIG. 2, and various types of loading devices capable of placing the electrode assembly 100 in the pouch 200 (see FIG. 1) may also be used.

As described above, the clamping unit 10 is configured to clamp or unclamp the electrode assembly 100. To this end, the clamping unit 10 includes a base 11 coupled to the front link 21 so as to be angularly or rotatably movable, a fixed fork 12 fixed in position to the base 11, and a moving fork 13 disposed on an outer surface of the base 11 so as to be displaceable along the longitudinal direction of the base 11. Preferably, the clamping unit 10 includes a pusher 14.

The base 11 is coupled to the front link 21 of the articulated robot 20. The base 11 may be formed in a plate shape capable of supporting and holding the fixed fork 12, the moving fork 13, the pusher 14, and the like.

The fixed fork 12 is installed outward at a lower end of the outer surface of the base 11 so as to load the electrode assembly 100 thereon. In other words, the fixed fork 12 may be formed to protrude from the lower end of the outer surface of the base 11 in a direction orthogonal thereto.

Optionally, an upper side of a free end of the fixed fork 12 may be formed in a shape conforming to the shape of the lower side of the electrode assembly 100. Also, the fixed fork 12 may be provided with an elastic member (no reference number) on the upper side of the free end thereof to elastically support the electrode assembly 100 while preventing damage to the electrode assembly 100 during clamping.

The moving fork 13 is disposed so as to be movable up and down along the longitudinal direction of the outer surface of the base 11. The moving fork 13 is up and down along the longitudinal direction of the base 11 with respect to the fixed fork 12 while varying the distance between the moving fork 13 and the fixed fork 12. Similar to the fixed fork 12, the moving fork 13 may also be formed to protrude in a direction orthogonal to the outer surface of the base 11, and a lower side of a free end of the moving fork 13 may be formed in a shape conforming to the shape of the upper side of the electrode assembly 100. Furthermore, the moving fork 13 may also be provided with an elastic member (no reference number) on the lower side of the free end thereof so as to elastically support the electrode assembly 100 while preventing damage to the electrode assembly 100 during clamping.

In addition, the present disclosure includes the pusher 14 that unclamps the electrode assembly 100 from the clamping unit 10 by lifting the moving fork 13 so as to be spaced apart from the upper side of the electrode assembly 100 and then pushes the electrode assembly 100 into the pouch 200.

The pusher 14 is configured to reciprocate on the fixed fork 12. To this end, the pusher 14 includes an actuator 14*a* and an operating rod 14*b* reciprocating forward and backward by the operation of the actuator 14*a*. Here, the actuator 14*a* is configured to provide a driving force for a reciprocating movement of the operating rod 14*b*, and may be any component that enables the reciprocating movement of the operating rod 14*b*, for example, a pneumatic cylinder, a hydraulic cylinder, or a motor.

As illustrated, the actuator 14*a* is installed at a lower end of an inner surface of the base 11, but is not limited thereto, and may be fixed in position at a lower side of the fixed fork 12. For example, the operating rod 14*b* may be coupled to the actuator 14*a* and extend toward an upper side of the fixed fork 12 through a through-hole 11*a* formed at the lower end of the base 11 so that when moving forward, the operating rod 14*b* pushes the electrode assembly 100 forward toward the pouch 200. The operating rod 14*b* is disposed horizontally at the same height (or level) as the electrode assembly 100 to be supported and held on the upper side of the fixed fork 12.

In addition, the pusher 14 further includes a tapered triangle-shaped pressing expansion part 14*c* that pressurizes the operating rod 14*b* to prevent damage to the electrode assembly 100 and at the same time evenly pushes the electrode assembly 100 forward direction to align the electrode assembly 100 in place in the pouch 200. The pressure extension part 14*c* reciprocates on the fixed fork 12 in conjunction with the forward and backward reciprocating movement of the operating rod 14*b*. Thus, during unclamping, the electrode assembly 100 is unclamped by moving the moving fork 13 upward to be separated from the fixed fork 12, and then the electrode assembly 100 is forcibly separated from the clamping unit 10 by moving the pressing extension part 14*c* of the pusher 14 forward (see FIG. 4B).

On the other hand, during clamping, the electrode assembly 100 is placed between the fixed fork 12 and the moving fork 13 after moving the operating rod 14*b* backward, and then the electrode assembly 100 is clamped by the clamping unit 10 by moving the moving fork 13 downward.

Figure 5A:
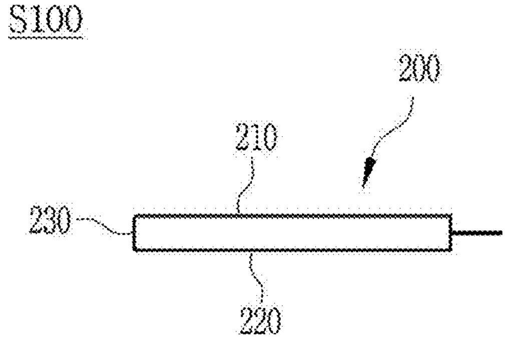
FIGS. 5A to 5D are schematic views sequentially illustrating an insertion process of a method of inserting an electrode assembly using the apparatus for inserting the electrode assembly illustrated in FIG. 2.
Figure 5B:
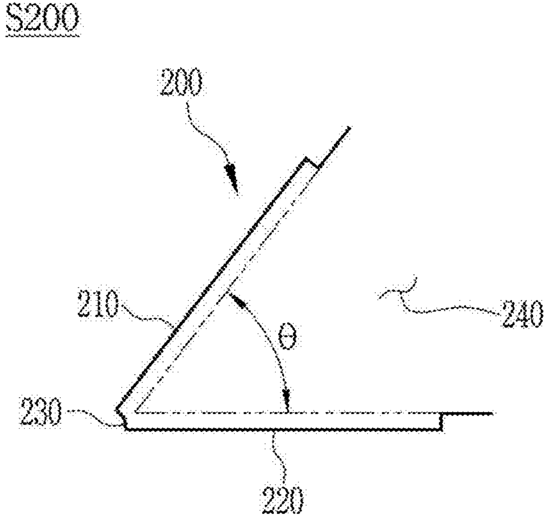

As illustrated in FIG. 5B, under a state in which the pouch 200 is opened in a folded state, the electrode assembly 100 is clamped by the clamping unit 10 rotatably coupled to the front link 21 of the articulated robot 20 and allowed for access to the inside of the pouch 200.

In other words, the electrode assembly 100 is introduced into the pouch 200 through an open space 240 between the upper pouch 210 and the lower pouch 220 that are folded or opened with respect to the hinge part 230. Thus, an introduction direction of the electrode assembly 100 is set using the articulated robot 20 according to an opening angle of the pouch 200, and the electrode assembly 100 is guided into the pouch 200. Since the configuration and motion setting of the articulated robot 20 is already widely known in the art, a detailed description thereof will be omitted herein.

FIGS. 5A to 5D are schematic views sequentially illustrating an insertion process of a method of inserting an electrode assembly 100 using the apparatus 1 for inserting the electrode assembly 100 illustrated in FIG. 2.

FIG. 5A is a view schematically illustrating a step of preparing the pouch 200 (S100). The pouch includes the upper pouch 210, the lower pouch 220, and the hinge part 230 foldably connecting the upper pouch 210 and the lower pouch 220 to each other.

Thus, the pouch 200 is configured to rotate the upper pouch 210 and/or the lower pouch 220 with respect to the hinge part 230 so that the upper pouch 210 and the lower pouch 220 are brought into contact with or are separated from each other.

FIG. 5B illustrates a step of opening the pouch 200 to accommodate the electrode assembly 100 therein (S200). The opening of the pouch 200 is achieved by opening the upper pouch 210 and the lower pouch 220 by unfolding the hinge part 230. As illustrated in FIG. 5B, the upper pouch 210 and the lower pouch 220 are opened in a folded state at a predetermined opening angle θ to accommodate the electrode assembly 100. Here, the opening angle θ means an angle range that defines an open space 240 between the upper pouch 210 and the lower pouch 220 facing the hinge part 230, more specifically, between an outer edge of the upper pouch 210 and an outer edge of the lower pouch 220 that face each other during folding.

In an embodiment of the present disclosure, the opening angle θ may be set to equal to or less than 90°, preferably an acute angle, and more preferably in the range of 45° to 90° to allow introduction of the clamping unit 10 together with the electrode assembly 100. With this angle range, a bendable range of the hinge part 230 is restricted, thereby preventing deformation of the hinge part 230 and improving durability compared to the state in which the pouch 200 is unfolded at 180° (see FIG. 1).

Figure 5C:
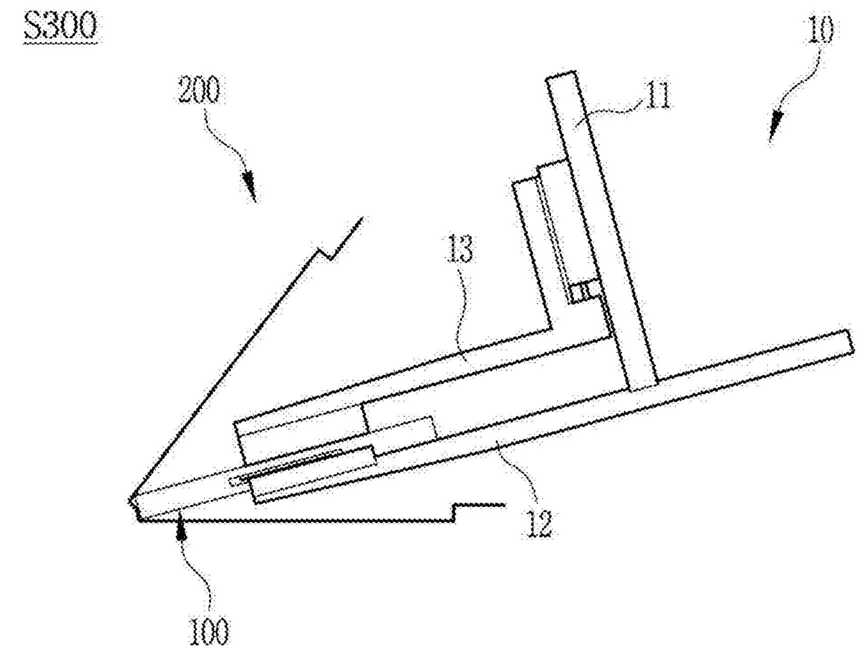

FIG. 5C is a view illustrates a step of introducing the clamping unit 10 of the apparatus for inserting the electrode assembly 100 (S300). The clamping unit 10 on which the electrode assembly 100 is clamped is inclinedly introduced at a predetermined angle through the open space 240 between the upper pouch 210 and the lower pouch 220. The clamping unit 10 moves the moving fork 13 downward to be brought into contact with the electrode assembly 100 placed on the fixed fork 12 and fixes the moving fork 13 in position. Then, the clamping unit 10 is positioned so as to be introduced into the open space 240 of the pouch 200 by a loading device such as an articulated robot.

In step S300, the clamping unit 10 guides the electrode assembly 100 forward toward the inside of the pouch 200. In other words, when the electrode assembly 100 is placed adjacent to or brought into contact with an inner surface of the hinge part 230. At this time, the electrode assembly 100 is inclinedly positioned in the pouch 200 through the clamping unit 10.

Figure 5D:
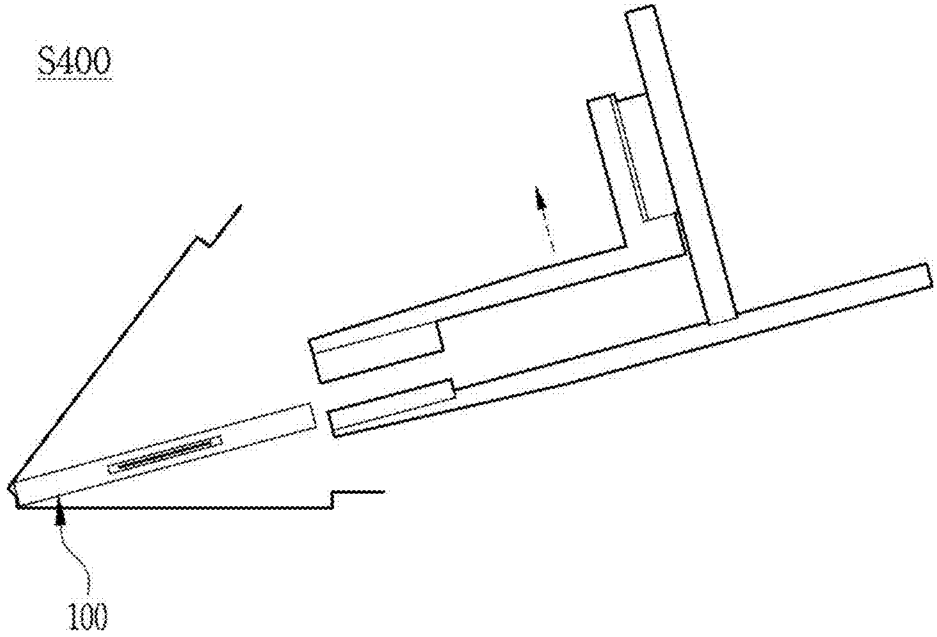

FIG. 5D illustrates a step of unclamping the electrode assembly 100, that is, separating the clamping unit 10 and the electrode assembly 100 from each other by moving the moving fork 13 upward and withdrawing the clamping unit 10 backward (S400). Similar to step S300, the clamping unit 100 is inclinedly withdrawn from the open space 240 at a predetermined angle.

As the clamping unit 10 is withdrawn, the electrode assembly 100 is placed into the second storage part 221 of the lower pouch 220. Since the electrode assembly 100 is in contact with the hinge part 230 on the second storage part 221 of the pouch 200, the present disclosure accommodates the electrode assembly 100 in the second storage part 221 while minimizing unnecessary collision between the electrode assembly 100 and the lower pouch 210 during placement.

When the clamping unit 10 is completely separated from the electrode assembly 100, an operator seals the spaced outer edges of the upper pouch 210 and the lower pouch 220 so as to face each other.

In addition, the present disclosure includes the following detailed steps to accommodate the electrode assembly 100 in place in the second storage part 221 of the lower pouch 220 during the withdrawal (S400) of the clamping unit 10.

Figure 6:
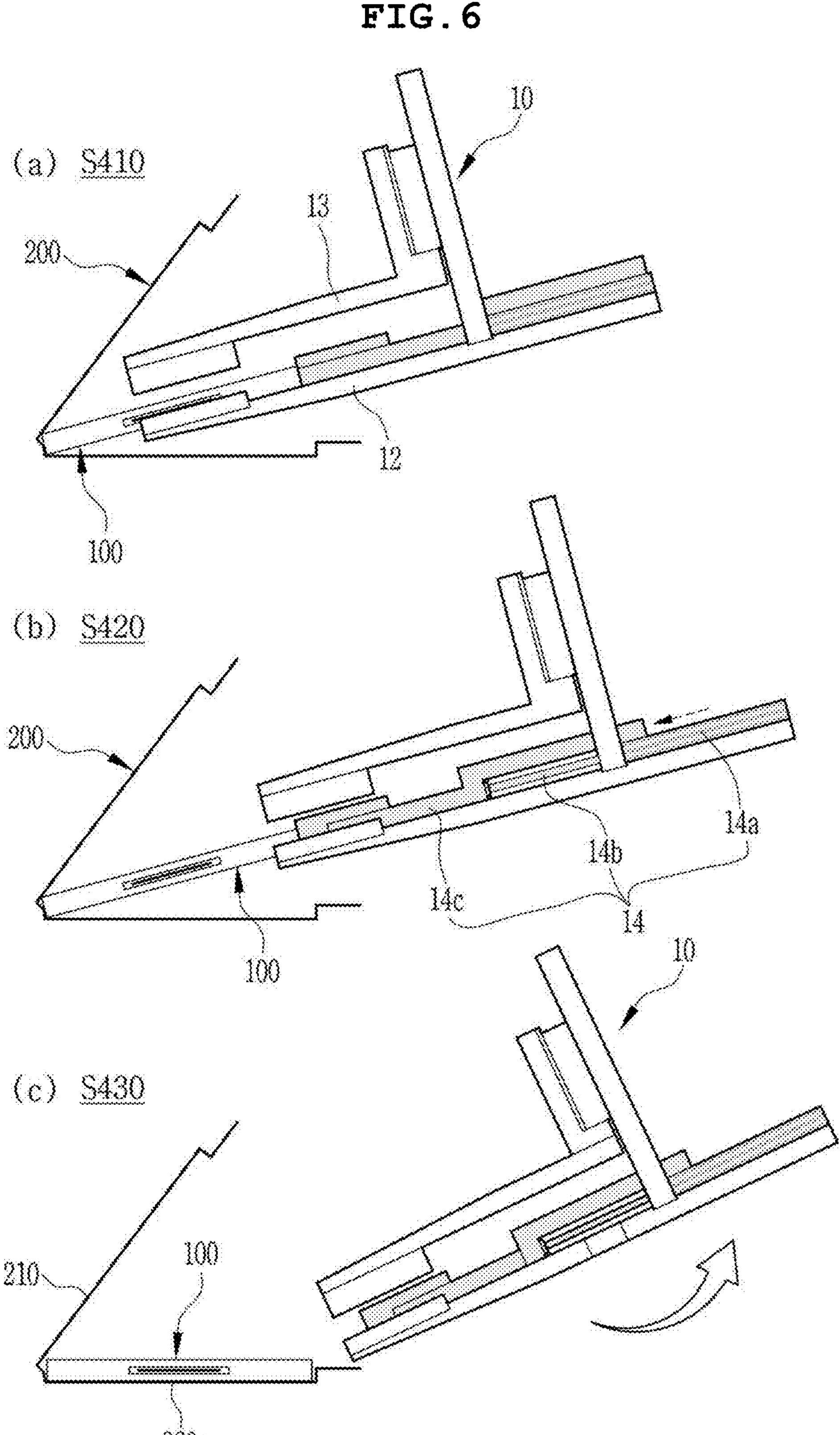
FIG. 6 is schematic views illustrating a withdrawal step of the apparatus for inserting the electrode assembly according to the present disclosure.

In step S400, the electrode assembly 100 is unclamped (S410). As illustrated in FIG. 6 (*a*), the unclamping of the electrode assembly 100 is achieved by lifting the moving fork 13 in a direction away from the electrode assembly 100 fixed in position on the fixed fork 12 of the clamping unit 10 so that the movement of the electrode assembly 100 is allowed.

Then, as illustrated in FIG. 6 (*b*), the electrode assembly 100 is pushed by the pusher 14 (S420). That is, the electrode assembly 100 is pushed into the second storage part 221 by moving the pusher 14 forward by a distance corresponding to the extent that the clamping unit 10 is moved backward through the open space 240.

Then, as illustrated in FIG. 6 (*c*), the clamping unit 10 is withdrawn while adjusting an inclination angle of the clamping unit 10 in an increasing manner as the clamping unit 10 is moved backward from the open space 240 of the pouch 200 (S430). This not only prevents contact between the fixed fork 12 and the lower pouch 220 and/or contact between the moving fork 13 and the upper pouch 210 in the process of withdrawing the clamping unit 10, but also helps to insert the electrode assembly 100 at a position as close as possible to the second storage part 221.

While the apparatus for inserting the electrode assembly and the method of inserting electrode assembly using the same according to the present disclosure have been described in conjunction with exemplary embodiments thereof, the embodiments are only examples of the present disclosure, it is to be understood that the present description is not intended to limit the present disclosure to those exemplary embodiments but is described for only an illustrative purpose. Therefore, those skilled in the art will appreciate that the present disclosure can be modified or changed in various forms without departing from the technical spirit of the present disclosure.

Simple modifications or changes of the present disclosure belong to the scope of the present disclosure, and the detailed scope of the present disclosure will be more clearly understood by the accompanying claims.

What is claimed is:

1. An apparatus for inserting an electrode assembly, the apparatus comprising:

a clamping unit configured to clamp or unclamp the electrode assembly; and an articulated robot comprising one or more links rotatably connected to each other by joint shafts and configured to mount the clamping unit on a front link, wherein the electrode assembly is inclinedly introduced and accommodated in a pouch through an open space between an upper pouch and a lower pouch.

2. The apparatus of claim 1, wherein the clamping unit comprises:

a base coupled to the front link of the articulated robot;

a fixed fork fixed in position to the base; and a moving fork disposed to be movable in a longitudinal direction of the base with respect to the fixed fork.

3. The apparatus of claim 2, wherein the clamping unit further comprises a pusher configured to reciprocate on the fixed fork to push the electrode assembly into the pouch.

4. The apparatus of claim 3, wherein the pusher comprises an actuator, an operating rod configured to reciprocate by operation of the actuator, and a pressing extension part disposed at a front end of the operating rod.

5. The apparatus of claim 1, wherein the pouch comprises the upper pouch, the lower pouch, and a hinge part foldably connecting the upper pouch and the lower pouch to each other, and the electrode assembly is introduced into the pouch through the open space, the open space being disposed to face the hinge part and formed between the upper pouch and the lower pouch.

6. The apparatus of claim 1, wherein an opening angle of the open space is set equal to or less than 90°.

7. A method of inserting an electrode assembly, the method comprising:

preparing a pouch that comprises an upper pouch, a lower pouch, and a hinge part foldably connecting the upper pouch and the lower pouch to each other;

opening the pouch to form an open space between the upper pouch and the lower pouch facing the hinge part;

introducing a clamping unit on which the electrode assembly is clamped through the open space; and withdrawing the clamping unit from which the electrode assembly is unclamped, wherein the electrode assembly is inclinedly introduced and accommodated in the pouch through the open space.

8. The method of claim 7, wherein the withdrawing of the clamping unit comprises:

unclamping the electrode assembly;

pushing the electrode assembly into the pouch; and withdrawing the clamping unit while adjusting an inclination angle of the clamping unit in an increasing manner as the clamping unit is moved backward.

9. The method of claim 7, wherein the clamping unit comprises:

a base configured to be angularly or rotatably movable;

a fixed fork fixed in position to the base; and a moving fork disposed to be movable in a longitudinal direction of the base with respect to the fixed fork.

10. The method of claim 9, wherein the clamping unit further comprises a pusher configured to reciprocate on the fixed fork to push the electrode assembly into the pouch.

11. The method of claim 7, wherein an opening angle of the open space is set equal to or less than 90°.

* * * * *